Feb. 23, 1954 H. K. LORENTZEN 2,670,038

VENETIAN BLIND HEAD BAR ORGANIZATION AND FITTINGS

Filed Oct. 17, 1951 3 Sheets-Sheet 1

INVENTOR
HANS K. LORENTZEN
BY
Barnes, Chisholm & Hilder
ATTORNEYS

Feb. 23, 1954 H. K. LORENTZEN 2,670,038

VENETIAN BLIND HEAD BAR ORGANIZATION AND FITTINGS

Filed Oct. 17, 1951 3 Sheets-Sheet 2

INVENTOR
HANS K. LORENTZEN
BY
Barnes, Chisholm & Kilder
ATTORNEYS

Feb. 23, 1954 H. K. LORENTZEN 2,670,038

VENETIAN BLIND HEAD BAR ORGANIZATION AND FITTINGS

Filed Oct. 17, 1951 3 Sheets-Sheet 3

INVENTOR
HANS K. LORENTZEN
BY
Ramsay, Chisholm & Hilder
ATTORNEYS

Patented Feb. 23, 1954 2,670,038

UNITED STATES PATENT OFFICE 2,670,038

VENETIAN BLIND HEAD BAR ORGANIZATION AND FITTINGS

Hans K. Lorentzen, Montclair, N. J., assignor to Lorentzen Hardware Mf'g. Corp., New York, N. Y., a corporation of New York Application October 17, 1951, Serial No. 251,707

4 Claims. (Cl. 160—177)

This invention relates to Venetian blinds and, more particularly, to operating mechanism for Venetian blind head bars.

In the so-called "enclosed head" type of Venetian blinds, the mechanism for raising the blind and tilting the slats of the blind is contained within a more or less enclosed head bar which may be formed of a sheet metal channel extending along the top of the blind. This mechanism may consist of a tilter fitting mounted adjacent one end of the head bar, a cord lock fitting mounted adjacent the other end, a tilt rod journalled in the tilter and cord lock fittings and extending longitudinally of the head bar, and two or more tape rockers mounted on the tilt rod and supporting the ladder tapes of the blind.

In the form shown of the present invention, the tilter and cord lock bodies are each formed of a single unitary sheet metal stamping having an extended base adapted to be mounted on the inside bottom wall of the head bar channel and extending towards the center of the blind and providing an integral, smooth bearing for passage of the individual lift cords through the bottom wall of the head bar.

In the cord lock according to the present invention, the cord lock housing is formed to provide a smooth, integral bearing for the depending looped end of the lift cords, thus eliminating the customary pulley. Both the tilter fitting and the cord lock fitting are provided with a member extending upwardly from the base and provided with a vertical notch receiving a tilt rod mounting flange of the adjacent tape rocker to restrain endwise movement of the tape rocker so as to maintain the ladder tapes aligned with openings provided for their passage in the bottom wall of the head bar.

In the other of present invention, the cord guide, which is positioned immediately below the cord pulley, is formed from a unitary portion of the tilter body turned upwardly and formed to provide cord-engaging portions. A portion of the tilter body displaced in forming the worm opening is utilized to form an end stop for the tilt rod.

Among the objects of the present invention are to provide a unitary cord lock housing; to provide a simplified tilter and cord lock each formed of a minimum number of parts; to provide a Venetian blind head bar assembly which is quickly and easily assembled and which is formed of a minimum number of parts, most of which may be economically produced from sheet metal stampings; to provide an assembly which is durable and dependable in operation; and to generally improve on Venetian blind operating mechanism.

Further objects and objects relating to details and economies of construction and use will more definitely appear from the detailed description to follow.

My invention is clearly defined in the appended claims. In the claims, as well as in the description, parts are at times identified by specific names for clarity and convenience, but such nomenclature is to be understood as having the broadest meaning consistent with the context and with the concept of my invention as distinguished from the pertinent prior art. The best form in which I have contemplated applying my invention is illustrated in the accompanying drawings forming part of this specification, in which:

Figure 1:
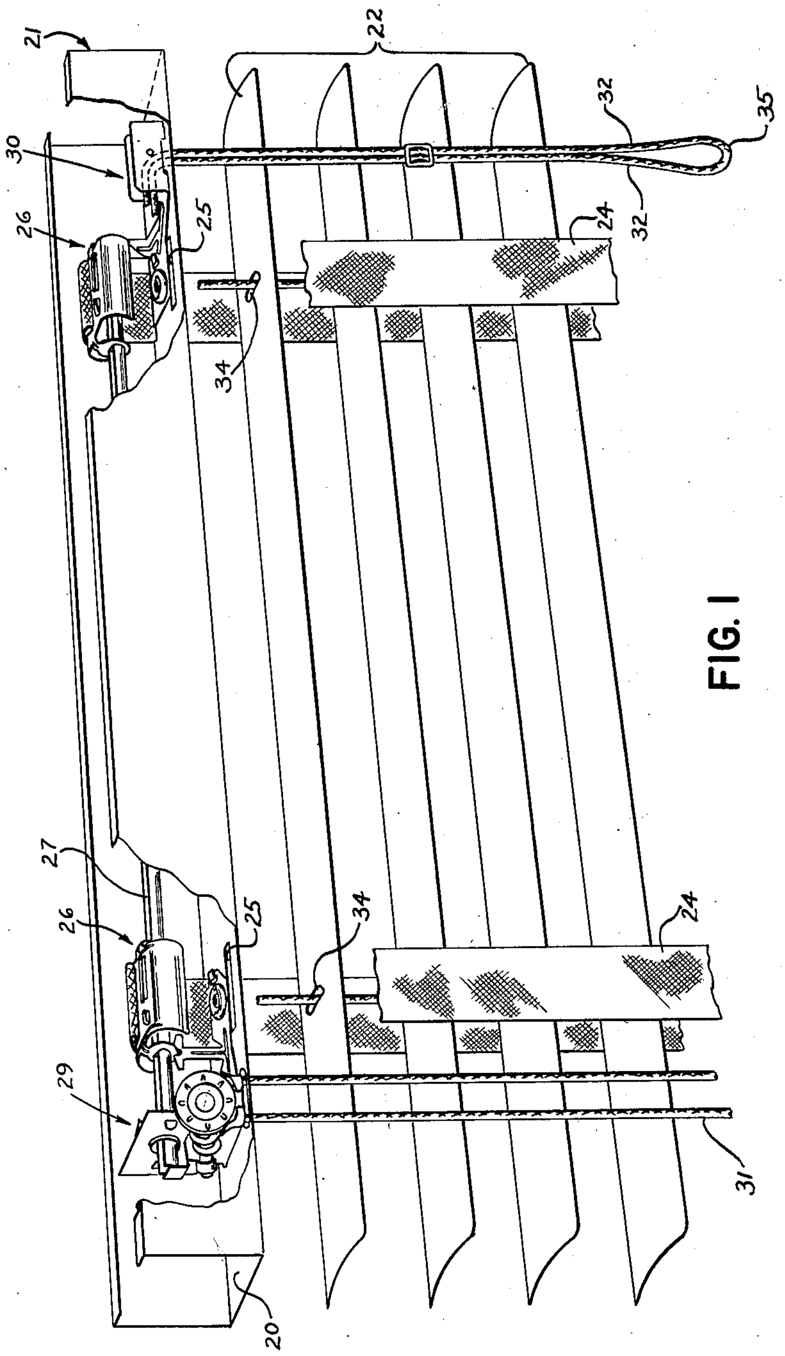
Fig. 1 is a perspective view on a reduced scale of a Venetian blind, the lower portion of the blind and portions of the front wall of the head bar, the lift cords, and ladder tapes being broken away for convenience of illustration.
Figure 2:
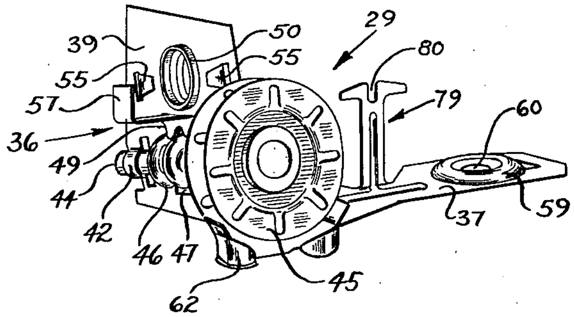
Fig. 2 is a perspective view of one form of tilter according to the present invention.
Figure 3:
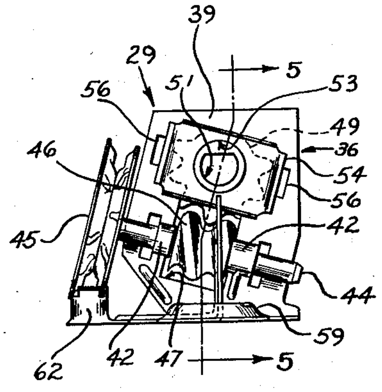
Fig. 3 is an end elevation of the tilter of Fig. 2.

Referring to Fig. 1, the Venetian blind there shown is of the enclosed head bar type, in which the operating mechanism of the blind is mounted on the inside bottom wall 20 of a channel-shaped sheet metal head bar 21. The slats 22 of the blind are supported by the customary ladder tapes 24, 24, the upper ends of which pass through slots 25 formed in the bottom wall 20 of the head bar.

The upper ends of the ladder tapes 24, 24 are secured to tape rockers 26, 26, which are mounted on a tilt rod 27 extending longitudinally of the head bar 21. The tilt rod 27 is mounted for rotation in a tilter 29 mounted adjacent one end of the head bar 21 and a cord lock 30 mounted adjacent the other end of the head bar, the tilter and cord lock supporting the tilt rod from the bottom wall of the head bar.

The slats 22 are tilted to closed position by oscillation of the tilt rod 27 in either direction by operation of the tilter 29, a tilt cord 31 being provided for this purpose.

Lift cords 32, 32 are reeved in the blind in the customary manner, the cords actually being formed of a single length of cord, the two ends of which are secured to the bottom bar (not shown) of the blind. The cords pass upwardly through aligned slots 34 of the slats and through the bottom wall 20 of the head bar, and then lead through the cord lock 30, a loop or bight of the cord 35 hanging from the cord lock at the right-hand end of the head bar. Both the tilter 29 and the cord lock 30 are provided with bearings to provide a smooth passage for the individual lift cords through the bottom wall 20 of the head bar, thus eliminating a separate cord guide for leading the lift cords down through the slats of the blind.

Referring now to Figs. 2–6, the tilter 29 comprises a unitary stamped sheet metal tilter body 36, the body having an extended base 37 and an upturned vertical portion or flange 39 for receiving a worm 46 and a meshing gear 49.

The vertical portion 39 of the tilter 29 is slotted to provide two pairs of arcuate straps 42 forming journals for a worm shaft 44 rotatably mounted in this portion of the tilter. Preferably, the worm shaft 44 is mounted at an angle to the horizontal, being forwardly upwardly inclined. A cord pulley 45 fixed to the forward end of the worm shaft 44 receives the tilt cord 31 thereabout for operating the tilter, and the worm gear 46 is fixed to the shaft 44 between the pairs of arcuate straps 42, the worm gear being received within an opening 47 formed in the vertical portion 39 of the tilter body.

The upper end of the vertical portion 39 of the tilter body is provided with a circular bearing or journal 50 to rotatably receive the tilt rod 27. Preferably, a portion of the metal displaced in forming the journal 50 is formed into a laterally extending sleeve on the outside surface of the portion 39 to provide an extended bearing area. In some respects, the tilter 29 is similar to the tilter shown in Nelson U. S. patent application S. N. 109,637, now U. S. Patent 2,630,861 issued Mar. 10, 1953.

The gear 49 is mounted against the inside face of portion 39 of the tilter body and has a D-shaped hole 51 for non-rotatably receiving the tilt rod 27, the hole 51 registering with the journal 50. The gear 49 is preferably formed of a sheet metal stamping and is provided with teeth meshing with the worm 46. Preferably, the teeth of the gear 49 extend for only about one-half the circumference of the gear to provide an escapement tilter, as generally shown in Nelson Patent 2,174,994.

The gear 49 is provided with a laterally extending bearing surface 52 which is rotatably received within a circular opening 53 in a gear retainer 54 overlying the gear and retaining it against the inside face of the portion 39 of the tilter. The gear retainer 54 may be provided with a pair of tabs 55, 55 passing through slots 56, 56 in the portion 39 of the tilter and clenched against the opposite side of the tilter portion to hold the gear retainer in position. The construction and assembly of the vertical portion of the tilter together with the worm 46, gear 49, and gear retainer 54, as thus far described, is in most respects generally similar to corresponding parts of the tilter shown in the copending application of Harry Nelson S. N. 109,637.

A portion of the metal displaced in forming the worm opening 47 in the vertical portion 39 of the tilter body is formed into a tilt rod end stop 57 extending outwardly from the portion 39 of the tilter body and then across a prolongation of the axis of the journal 50, so as to lie across the end of a tilt rod passed through the journal.

Figure 11:
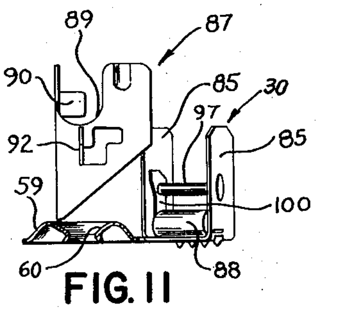
Fig. 11 is a vertical section of the cord lock of Fig. 10, taken on the line 11—11 of Fig. 10.
Figure 12:
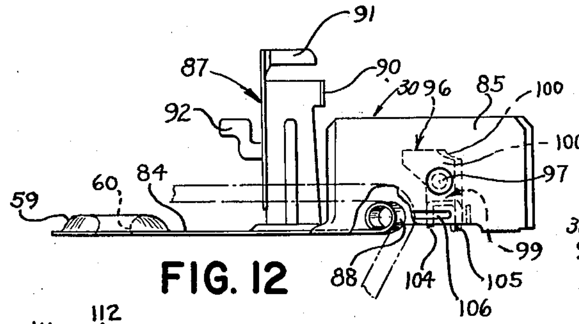
Fig. 12 is a front elevation of the cord lock of Figs. 10 and 11, a portion of the cord lock body being broken away and the lift cord being indicated in dot-dash lines.
Figure 13:
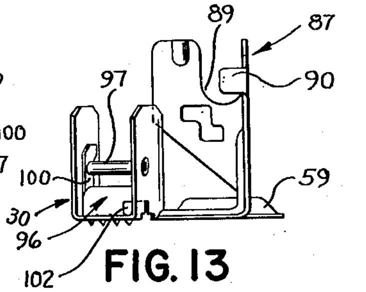
Fig. 13 is an end elevation of the cord lock of Figs. 10–12.
Figure 14:
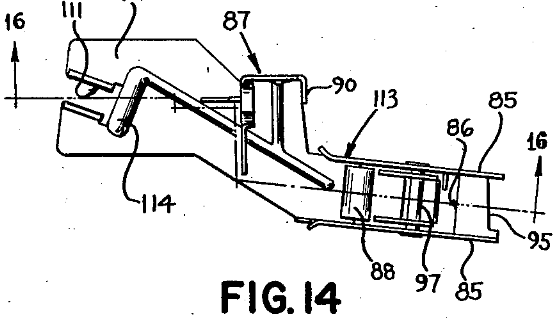
Fig. 14 is a top plan view of a second form of cord lock according to the present invention, having a modified bearing for passage of the individual lift cord.
Figure 16:
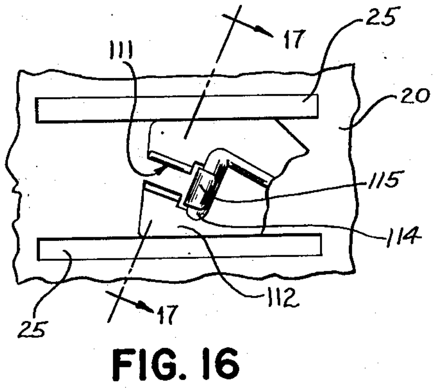
Fig. 16 is a top plan view of the lift-cord-bearing portion of the cord lock of Figs. 14 and 15 and the adjacent portion of the head bar.
Figure 15:
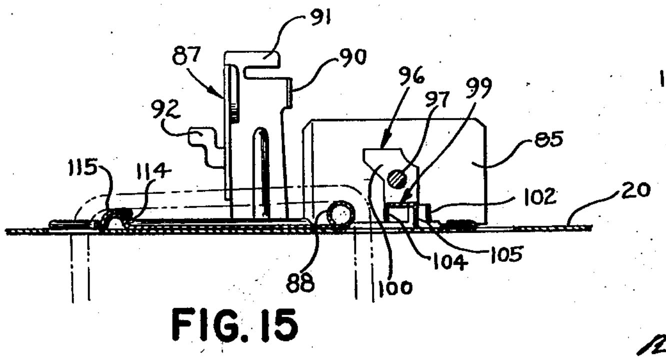
Fig. 15 is a vertical section through the cord lock of Fig. 14, taken on the line 15—15 thereof, the lift cords being indicated in dot-dash lines.
Figure 17:
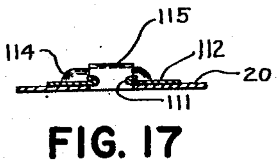
Fig. 17 is a vertical section of the lift cord bearing of the cord lock and adjacent portion of the head bar, taken on the line 17—17 of Fig. 16.

The base 37 of the tilter body is generally flat and in the assembly indicated in Fig. 1 extends towards the center of the blind at least as far as the adjacent ladder tape 24. The inner end portion of the base 37 is, in the form of tilter shown in Figs. 2, 3, 4, and 6, provided with a circular raised bead 59 extending about a round hole 60 to provide a smooth bearing surface for passage of a lift cord 32 downwardly through the bottom wall 20 of the head bar, the head bar being provided with a somewhat larger hole (not shown) so as to avoid contacting the lift cord. The margin of the hole 60 is turned radially outward as best indicated in Fig. 11, showing the cord lock 30 which also has a similar lift cord bearing, to provide a smooth cord bearing.

The base 37 of the tilter is also provided with a pair of slots 61, 61 which, in the assembly indicated in Fig. 1, receives tabs struck up from the bottom wall 20 of the head bar and clenched against the upper surface of the base 37 to retain the tilter in position.

Figure 4:
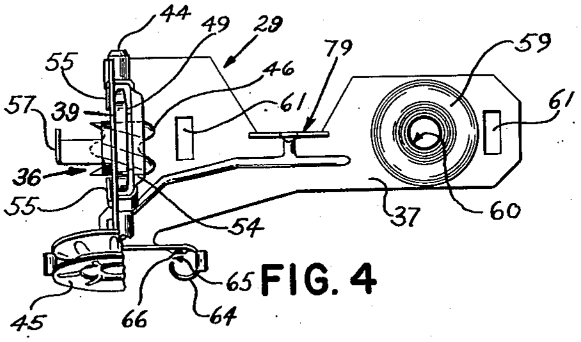
Fig. 4 is a top plan view of the tilter of Figs. 2 and 3.
Figure 5:
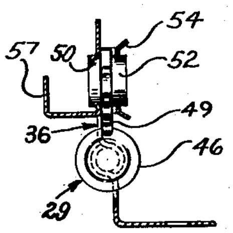
Fig. 5 is a section of the tilter of Figs. 2–4, taken generally on the line 5—5 of Fig. 3.

The edge of the base 37 of the tilter below the cord pulley 45 is inclined upwardly into a plane generally perpendicular to the worm shaft 44 and lying immediately behind the cord pulley and formed to provide a cord guide 62 for the tilt cord 31. The ends of this upturned portion of the base are turned forwardly and inwardly as indicated in Fig. 4 to form a pair of spaced, upwardly flaring, barrellike, cord-receiving formations 64, 64. The barrellike formations 64, 64 do not extend completely about the cord but have opposed side openings 65, 65 to permit lateral insertion of the tilt cord, a short, raised bead 66 on the rear, inner surface of each barrel adjacent the opening aiding in retaining the tilt cord within the cord guide and preventing fraying of the cord on the lower edge thereof.

Figures 6, 7:
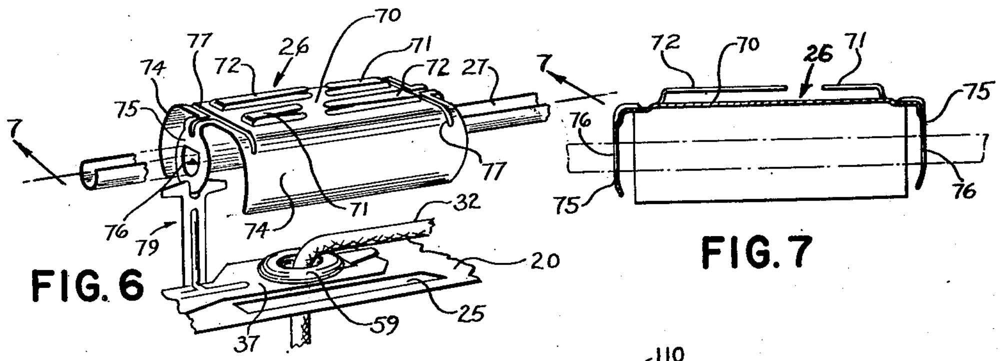
Fig. 6 is a fragmentary detailed view of portions of the head bar, tilter, tilt rod, and tape rocker, showing interrelation of the parts.
Fig. 7 is a longitudinal section of the tape rocker, taken on the line 7—7 of Fig. 6, the tilt rod being shown in dot-dash lines.

Before completing the description of the base 31 of the tilter, the nature of the tilt rod and tape rocker with which it coacts will be considered. The tilt rod 27, as shown in Figs. 1 and 6, may be of any noncircular cross section and is preferably formed of a piece of steel strip rolled or otherwise formed as indicated in the drawings to form a C-shaped section adapted to be closely received within the D-shaped hole 51 in the gear 49.

The tilt rod 27 has mounted thereon a pair of tape rockers 26, 26, one tape rocker supporting each of the ladder tapes. These tape rockers are best shown in Figs. 6 and 7 and each comprises a sheet metal stamping having a generally flat top portion 70 which may be provided with pairs of opposed, short and long fingers 71, 71 and 72, 72, respectively, or other ladder tape engaging means. Fingers generally similar to fingers 71, 71 and 72, 72 are shown in Nelson copending application S. N. 771,981, now U. S. Patent 2,589,846 issued Mar. 18, 2952.

A pair of arcuate, depending side flanges 74, 74 extends downwardly from the lateral edges of the top portion 70 of the tape rocker, these side flanges being generally concentric with the axis of the tilt rod 27. Each tape rocker 26 is provided with a pair of generally circular end flanges 75, 75 depending from the ends of the top portion 70 of the tape rocker and provided with D-shaped holes 76, 76 for nonrotatably receiving the tilt rod 27, the outer margin of the flanges being substantially concentric with the axis of the tilt rod. If desired, stiffening flanges 77, as shown, may be provided to reinforce the tape rocker against bending.

The base 37 of the tilter 29 is provided with an upwardly extending tape rocker guide portion 79 provided with a transversely extending, upwardly opening slot 80 to receive an end flange 75 of the tape rocker. The guide portion 79 and slot 80 are so located as to maintain the tape rocker centered over the slots 25 provided in the bottom wall of the head bar for passage of the ladder tapes by restraining endwise movement of the tape rocker. Preferably, the upper end of the guide portion 79 is laterally extended on both sides of the slot 80 to aid in preventing misassembly of the tape rocker. If the tape rocker were displaced so far as not to be engaged by the extensions of the guide portion 79, it would be readily apparent to the head bar assembler and the misassembly of the parts would be corrected immediately.

The cord lock of the present invention, as shown in Figs. 10–13, comprises a stamped sheet metal cord lock body 81 having an extended base 84 and upwardly directed, generally parallel flanges 85, 85 forming the cord lock housing. The inner end portion of the base 84 has a lift cord bearing similar to the lift cord bearing in the tilter 29, and corresponding portions of this bearing have been given the same reference numerals.

In the assembly shown in Fig. 1, the lift cords 32, 32 are led along the head bar from the lift cord bearings and between the flanges 85, 85, the looped, depending end of the lift cord hanging down from the cord lock. A portion of the base 84 between the flanges 85, 85 is cut away to form a hole 86 for downward passage of the lift cords, a portion of the cutaway metal being curled upwardly in a direction towards the lift cord bearing to form a smooth, generally cylindrical, cord bearing surface 88 extending transversely between the inner sides of the flanges 85, 85 and forming an integral bearing for passage of the lift cords, thus obviating the customary cord pulley.

The intermediate portion of the cord lock body 81 is provided with an upwardly directed formation 87 which may be generally L shaped in horizontal cross section. The formation 87, which may be formed as indicated in the drawings, has an upwardly opening tilt rod bearing 89 for receiving the cord lock end of the tilt rod 27. A portion of the formation 87 lies across the projection of the bearing 89, being spaced outwardly slightly therefrom so as to form a tilt rod end stop 90, and a bendable finger 91 on one side of the bearing 89 may be bent into position across the top of the bearing 89 so as to retain the tilt rod 27 within the bearing. The finger 91 is generally similar to that shown in Lorentzen U. S. Patent 2,262,949.

The portion of the formation 87 surrounding the tilt rod bearing 89 forms a flat, transverse surface from which an upwardly and inwardly directed finger 92 may be stamped, the finger and the formation 87 together forming an upwardly opening slot or guide for receiving an end flange 75 of the adjacent tape rocker 76 in order to restrict endwise movement of the tape rocker. The finger 92 preferably extends a substantial distance horizontally away from the vertical face of the formation 87 to assure correct assembly of the tape rocker, as described in connection with the guide portion 79 of the tilter fitting 29. However, in the present instance, the face of the formation 87 prevents the tape rocker end flange 75 from falling on the other side of the formation and, therefore, extension on one side only of the slot is required.

The base 84 of the cord lock fitting 30 may be provided with a slot 94 adjacent the circular raised bead 59 to receive a bendable tab stamped from the bottom wall of the head bar, which is clenched against the base to hold the fitting in position. In addition, a second bendable tab stamped from the bottom wall of the head bar may be clenched against the top surface of the base 84 between the flanges 85, 85 of the cord lock housing, the base being cut back slightly at 95 to receive the tab. Portions of the cord lock fitting may be provided with slightly raised, stiffening beads, if desired, to increase their stiffness.

The cord lock 30 is provided with a locking dog 96 which is pivotally mounted on a rivet 97 extending between the vertical flanges 85, 85 of the cord lock housing. The locking dog 96 has a cord-engaging body portion 99 and a pair of parallel ears 100, 100 extending from the two ends of the body portion and through which the rivet 97 passes. Preferably, the ears 100, 100 extend past the rivet 97 on the same side of the rivet as the cord-bearing surface 88 (see Fig. 12) to provide a counterweight for rotating the locking dog counterclockwise, as viewed in Fig. 12, towards nonlocking position. Preferably, a tab 102 is struck inwardly from the bottom edge portion of one of the flanges 85, 85 to provide a stop for limiting rotation of the locking dog away from locking position.

The body portion 99 of the locking dog may be formed generally U shaped in transverse section to provide a pair of toothed cord-engaging portions 104 and 105 for locking the cord against the cord lock bearing 88. Preferably, the cord-engaging portion 105 projects slightly further from the rivet 97 than the portion 104, the locking dog accommodating some variation in the size of the lift cord. An inwardly pressed bead 106 may be formed along the lower edge of the front flange 85 of the cord lock to prevent the adjacent lift cord from chafing against the lower edge of this flange.

Figure 8:
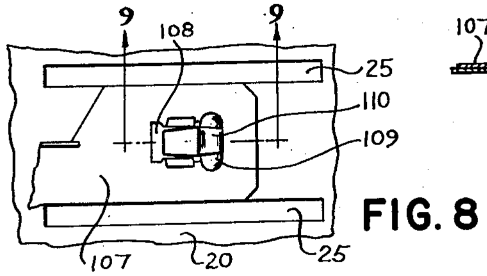
Fig. 8 is a top plan view of the lift cord bearing portion of a second form of tilter, together with the adjacent portion of the head bar.
Figure 9:
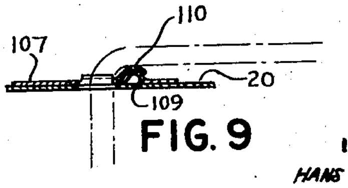
Fig. 9 is a vertical section of the lift cord portion of the tilter and adjacent portion of the head bar, taken on the line 9—9 of Fig. 8.
Figure 10:
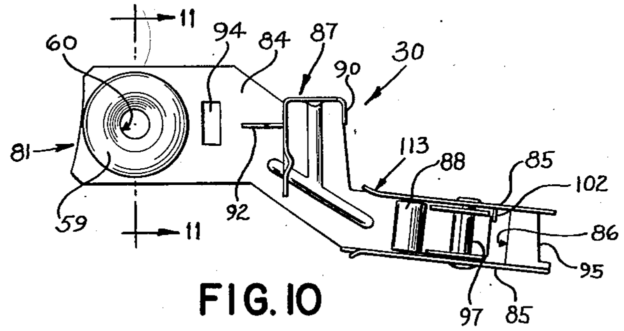
Fig. 10 is a top plan view of one form of cord lock according to the present invention.

Instead of the lift cord bearing above described in the tilter of Figs. 1–6 and the cord lock of Figs. 1 and 10–13, an alternative lift cord bearing may be provided for both the tilter and the cord lock, the alternative cord bearing used in connection with the tilter being shown in Figs. 8 and 9 and the alternative lift cord bearing used with the cord lock being shown in detail in Figs. 14–17.

Referring now to Figs. 8 and 9, the inner end portion of the base 107 of the tilter may be provided with a slot 108, the side and outer end (towards the end of the head bar) margins of the slot preferably being folded upwardly and back upon themselves to form smooth edges and an upwardly pressed bead 109 being formed along the margin of the inner end (towards the cord lock) of the slot 108.

In assembling onto a head the modified form of the tilter having the type of cord bearing just described, a tab 110 struck from the bottom wall of the head bar is clenched over the bead 109 to hold the tilter in position within the head bar, the bead causing the tab to be bent into a smooth, rounded surface providing a smooth bearing for the lift cord. Ordinarily, the head bar channel with which this form of tilter is to be used is painted before punching and assembly of the head bar and, therefore, the cord-bearing surface formed by the tab 110 has a smoothly painted surface which provides a very smooth bearing for the lift cord.

The modified form of lift cord bearing for the cord lock fitting (shown in Figs. 14–17) is essentially the same as the lift cord bearing of the tilter, described immediately above. A slot 111 in the inner end portion of the cord lock base 112 receives the lift cord, the side margins of the slot being bent backwardly on themselves as described in connection with the tilter lift cord bearing. The slot 111 is aligned towards the cord lock housing 113 and a raised bead 114 extending along the end of the slot 111 and corresponding to the bead 109 of the tilter, receives the clenched tab 115 of the head bar.

I claim:

1. For an enclosed Venetian blind head-bar organization, a fitting for supporting a tilt rod extending longitudinally of the head bar and having a tape rocker mounted thereon for receiving the upper ends of a ladder tape, said fitting comprising: a stamped sheet-metal body having a generally flat, horizontal base portion, a portion of the body being formed into a generally flat, tape-rocker-engaging portion lying in a generally vertical plane extending longitudinally of the head bar, said tape-rocker-engaging portion being provided with an upwardly opening slot for receiving a radially extending end flange of the tape rocker to restrain endwise movement of the tape rocker.

2. For an enclosed Venetian blind head-bar organization, a fitting for supporting an end of a tilt rod extending longitudinally of the head bar and having tape rockers mounted thereon for receiving the upper ends of ladder tapes, said fitting comprising: a stamped sheet-metal body having a generally flat, horizontal base portion, a portion of the body being formed into a generally flat, tape-rocker-engaging portion lying in a generally vertical plane extending longitudinally of the head bar, said tape-rocker-engaging portion being provided with an upwardly opening slot for receiving a radially extending end flange of the tape rocker to restrain endwise movement of the tape rocker, the upper edge of said tape-rocker-engaging portion on at least one side of the slot extending longitudinally of the head bar on a level with the slot for a distance at least several times the width of the slot.

3. For an enclosed Venetian blind head-bar organization, a fitting for supporting an end of a tilt rod extending longitudinally of the head bar and having tape rockers mounted thereon for receiving the upper ends of ladder tapes, said fitting comprising: a stamped sheet-metal body having a generally flat, horizontal base portion, a portion of the body being formed into a generally flat, tape-rocker-engaging portion lying in a generally vertical plane and extending longitudinally of the head bar, said tape-rocker-engaging portion being provided with an upwardly opening slot for receiving a radially extending end flange of the tape rocker to restrain endwise movement of the tape rocker, the upper edge of said tape-rocker-engaging portion on one side of the slot extending longitudinally of the head bar on a level with the slot for a distance at least several times the width of the slot and the tape-rocker-engaging portion at the other side of the slot extending vertically upwardly above the level of the slot.

4. For an enclosed Venetian blind head-bar organization, a fitting for supporting an end of a tilt rod extending longitudinally of the head bar and having tape rockers mounted thereon for receiving the upper ends of ladder tapes, said fitting comprising: a stamped sheet-metal body having a generally flat, horizontal base portion, a portion of the body being formed into a generally flat, tape-rocker-engaging portion lying in a generally vertical plane extending longitudinally of the head bar, said tape-rocker-engaging portion being provided with an upwardly opening slot for receiving a radially extending end flange of the tape rocker to restrain endwise movement of the tape rocker, the upper edge of said tape-rocker-engaging portion on both sides of the slot extending longitudinally of the head bar on a level with the slot for a distance at least several times the width of the slot.

HANS K. LORENTZEN.

References Cited in the file of this patent

UNITED STATES PATENTS

| Number | Name | Date |
|---|---|---|
| 2,057,608 | Carroll | Oct. 13, 1936 |
| 2,064,094 | Wiener | Dec. 15, 1936 |
| 2,223,633 | McKerlie | Dec. 3, 1940 |
| 2,226,623 | Lorentzen | Dec. 31, 1940 |
| 2,230,807 | Lorentzen | Feb. 4, 1941 |
| 2,396,425 | Hunter | Mar. 12, 1946 |
| 2,421,505 | Hunter | June 3, 1947 |
| 2,469,839 | Nelson | May 10, 1949 |
| 2,482,036 | Stutz | Sept. 13, 1949 |
| 2,495,888 | Burns | Jan. 31, 1950 |
| 2,584,607 | Nardulli | Feb. 5, 1952 |
| 2,614,623 | Nelson | Oct. 21, 1952 |
| 2,614,624 | Stuber et al. | Oct. 21, 1952 |